(12) United States Patent
Thurn et al.

(10) Patent No.: US 7,252,302 B1
(45) Date of Patent: Aug. 7, 2007

(54) CART ASSEMBLY

(76) Inventors: Kelly B. Thurn, 930 S. Jackson Ave., Bartow, FL (US) 33830; Jeff A. Thurn, 930 S. Jackson Ave., Bartow, FL (US) 33830

( * ) Notice: Subject to any disclaimer, the term of this patent is extended or adjusted under 35 U.S.C. 154(b) by 256 days.

(21) Appl. No.: 11/040,450

(22) Filed: Jan. 24, 2005

(51) Int. Cl.
*B62B 3/02* (2006.01)

(52) U.S. Cl. .................. 280/638; 280/659; 280/47.34; 280/79.2

(58) Field of Classification Search ............. 280/47.34, 280/47.35, 79.11, 79.2, 79.3, 35, 638, 659, 280/33.992, 30; 224/409, 411
See application file for complete search history.

(56) References Cited

U.S. PATENT DOCUMENTS

| | | | | |
|---|---|---|---|---|
| 2,645,538 A * | 7/1953 | Segal | .......................... | 108/145 |
| 3,218,090 A * | 11/1965 | Herman | .................... | 280/47.26 |
| 3,407,959 A * | 10/1968 | Mondineu | ...................... | 220/6 |
| 3,810,648 A | 5/1974 | Hallenins | | |
| 4,441,734 A * | 4/1984 | Schlissel | ...................... | 280/638 |
| 4,492,388 A | 1/1985 | de Wit | | |
| 4,678,195 A * | 7/1987 | Trubiano | ............... | 280/33.992 |
| 4,887,836 A | 12/1989 | Simjian | | |
| 5,425,545 A * | 6/1995 | McCusker | ................... | 280/30 |
| D391,031 S | 2/1998 | Egan et al. | | |
| D406,430 S | 3/1999 | Ross | | |
| 5,915,723 A * | 6/1999 | Austin | ......................... | 280/651 |
| 6,045,150 A | 4/2000 | Al-Toukhi | | |
| 6,068,356 A * | 5/2000 | Giuseppe | .................... | 312/290 |
| 6,070,899 A | 6/2000 | Gines | | |
| 6,354,619 B1 | 3/2002 | Kim | | |
| 6,446,981 B1 | 9/2002 | Wise et al. | | |
| 6,446,986 B1 * | 9/2002 | Ames | .................... | 280/33.997 |
| 6,471,236 B1 | 10/2002 | Eskridge | | |
| 6,474,665 B1 * | 11/2002 | Fink et al. | ................. | 280/79.2 |
| 6,601,860 B2 * | 8/2003 | Potter | ....................... | 280/47.34 |
| 6,935,644 B1 * | 8/2005 | Oranday | .................. | 280/47.34 |
| 6,945,546 B2 * | 9/2005 | Guirlinger | ............... | 280/47.19 |

\* cited by examiner

*Primary Examiner*—Frank Vanaman

(57) ABSTRACT

A cart assembly includes a frame that includes a bottom wall and four posts attached to and extending upwardly from the bottom wall. Four bars are attached to adjacent ones of the posts. The bars are positioned such that a front bar, a back bar, a first side bar and a second side bar are defined. Each one of four mesh walls extends between the bottom wall and one of the bars so that each of the posts has an adjacent pair of mesh walls orientated perpendicular to each other. A cover is hingedly coupled to frame and selectively positionable in an open position extending upwardly from the frame or in a closed position orientated parallel to a plane of the loop. A handle and a pair of rails are each attached to the frame.

8 Claims, 5 Drawing Sheets

CART ASSEMBLY

BACKGROUND OF THE INVENTION

1. Field of the Invention

The present invention relates to cart devices and more particularly pertains to a new cart device for holding a persons belongs and purchases while they are shopping in a mall and for protecting those items from the elements when a person travels into and out of a store.

2. Description of the Prior Art

The use of cart devices is known in the prior art. U.S. Pat. No. 4,887,836 describes a cart that has foldable side panels for easy storage and transporting. Another type of cart device is U.S. Pat. No. 6,070,899 describes a device having a general shopping cart shape but which has retractable legs so that the device may be pushed into a sport utility vehicle. Yet another such device is found in U.S. Pat. No. Design 391,222 which depict a wheeled cart apparatus.

While these devices fulfill their respective, particular objectives and requirements, the need remains for a device that is specifically designed to aid a person who is shopping in a mall and more specifically requires a cart that is adapted for carrying a wide variety of items. In particular, the device should be able to accommodate the hanging of clothes, which are placed on a hanger as well as contain one or more compartments for holding shopping bags or personal items such as purses and cellular phones. Additionally, the device should be lockable to prevent theft of its contents.

SUMMARY OF THE INVENTION

The present invention meets the needs presented above by generally comprising a frame that includes a bottom wall having a generally rectangular shape and including four corners. Four posts are attached to and extend upwardly from the bottom wall. Each of the posts is positioned adjacent to one of the corners. Each of the posts has an upper end. Four bars each are attached to and extend between a pair of adjacent ones of the upper ends of the posts so that the bars form a rectangular loop. The bars are positioned such that a front bar, a back bar, a first side bar and a second side bar of the loop are defined. Each one of four mesh walls is attached to the bottom wall and extends between an adjacent pair of the posts so that each of the posts has an adjacent pair of mesh walls orientated perpendicular to each other. The mesh walls are each vertically orientated and each is attached to one of the bars. A cover is hingedly coupled to frame. The cover is selectively positionable in an open position extending upwardly from the frame or in a closed position orientated parallel to a plane of the loop. A handle is attached to the frame. A first of rail is attached to the first side bar and a second rail is attached to the second side bar. A plurality of wheels is rotatably coupled to a bottom surface of the bottom wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
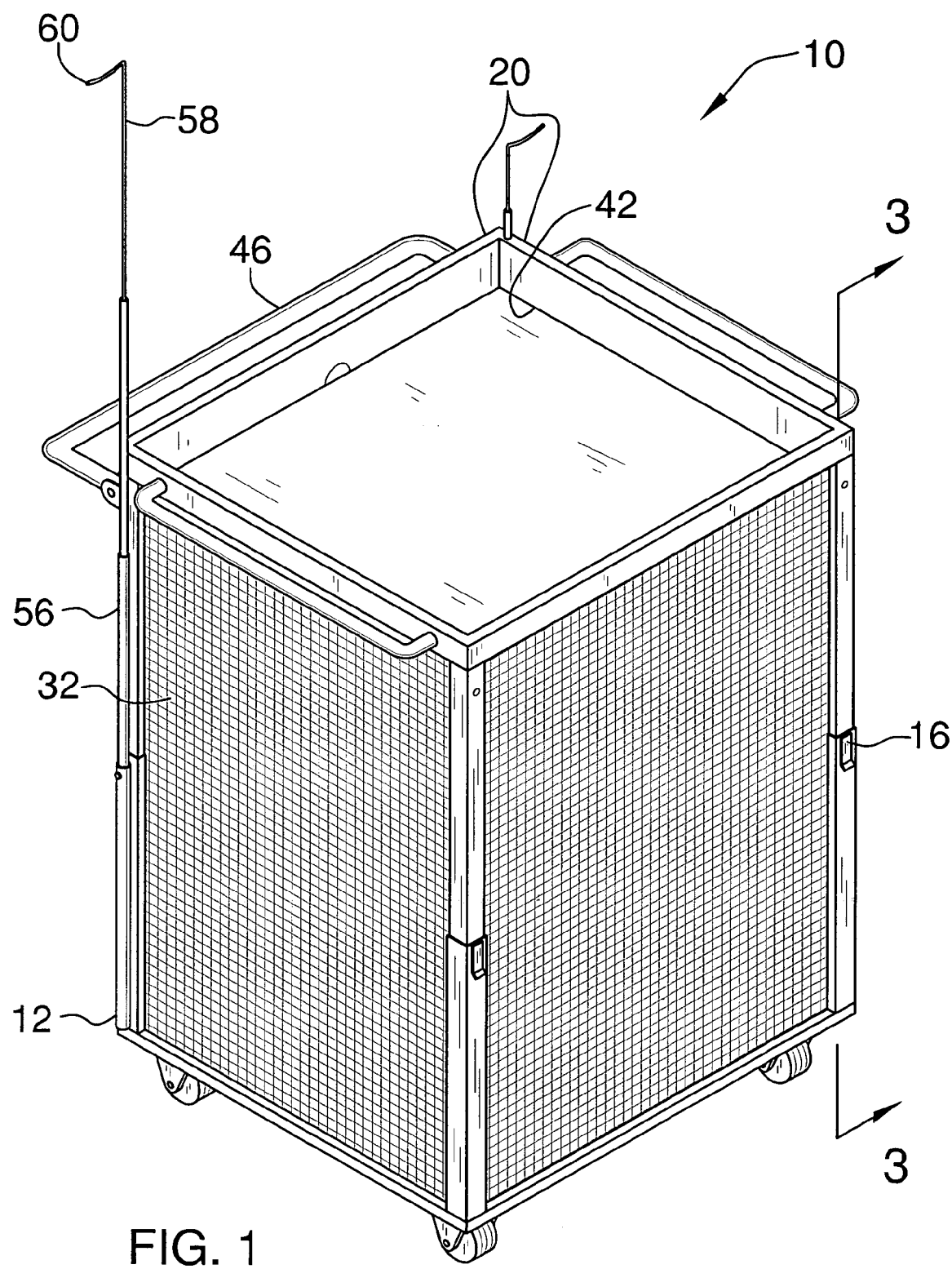
FIG. 1 is a perspective view of a cart assembly according to the present invention.
Figure 2:
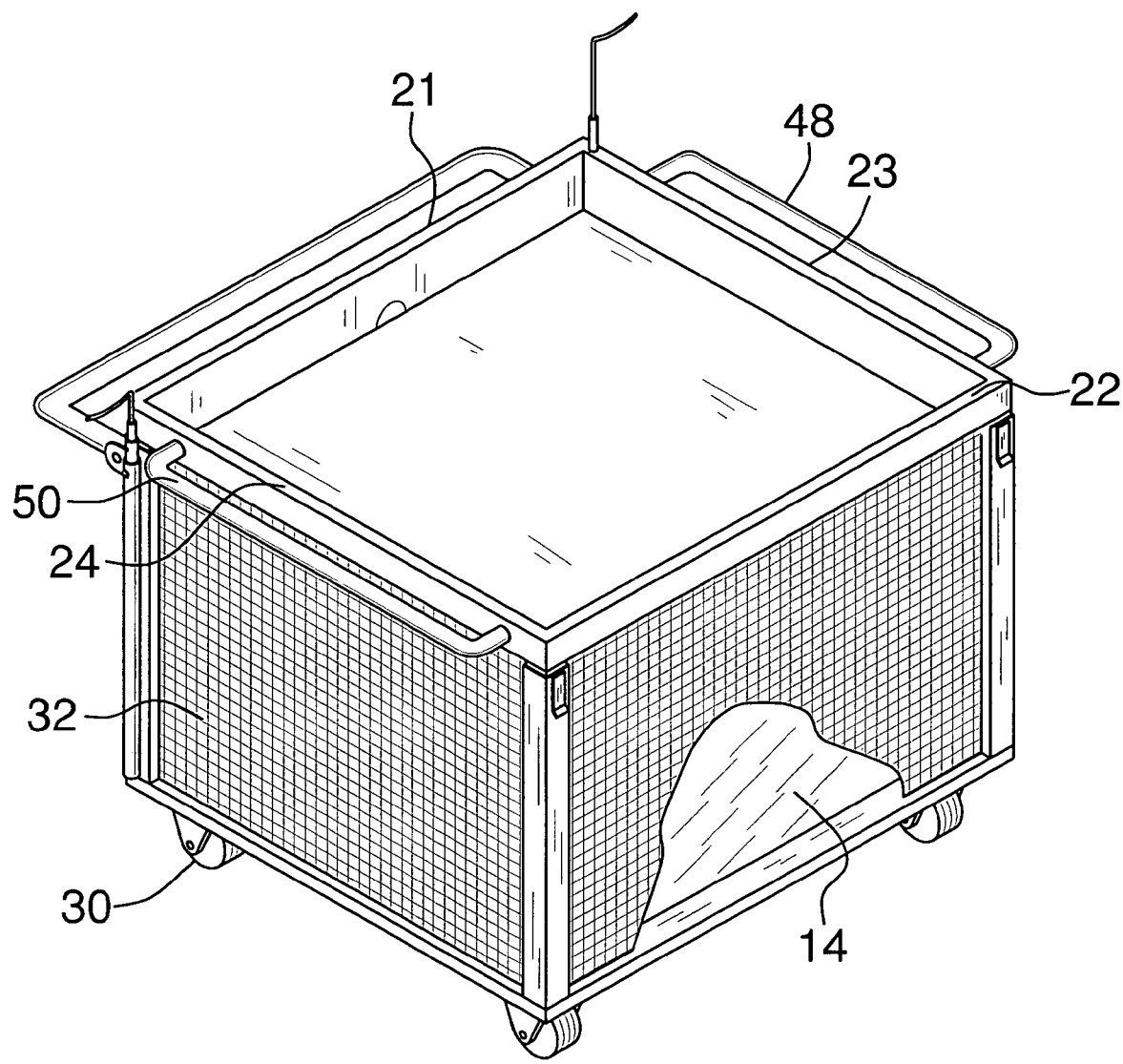
FIG. 2 is a broken perspective view of the present invention in a collapsed position.
Figure 3:
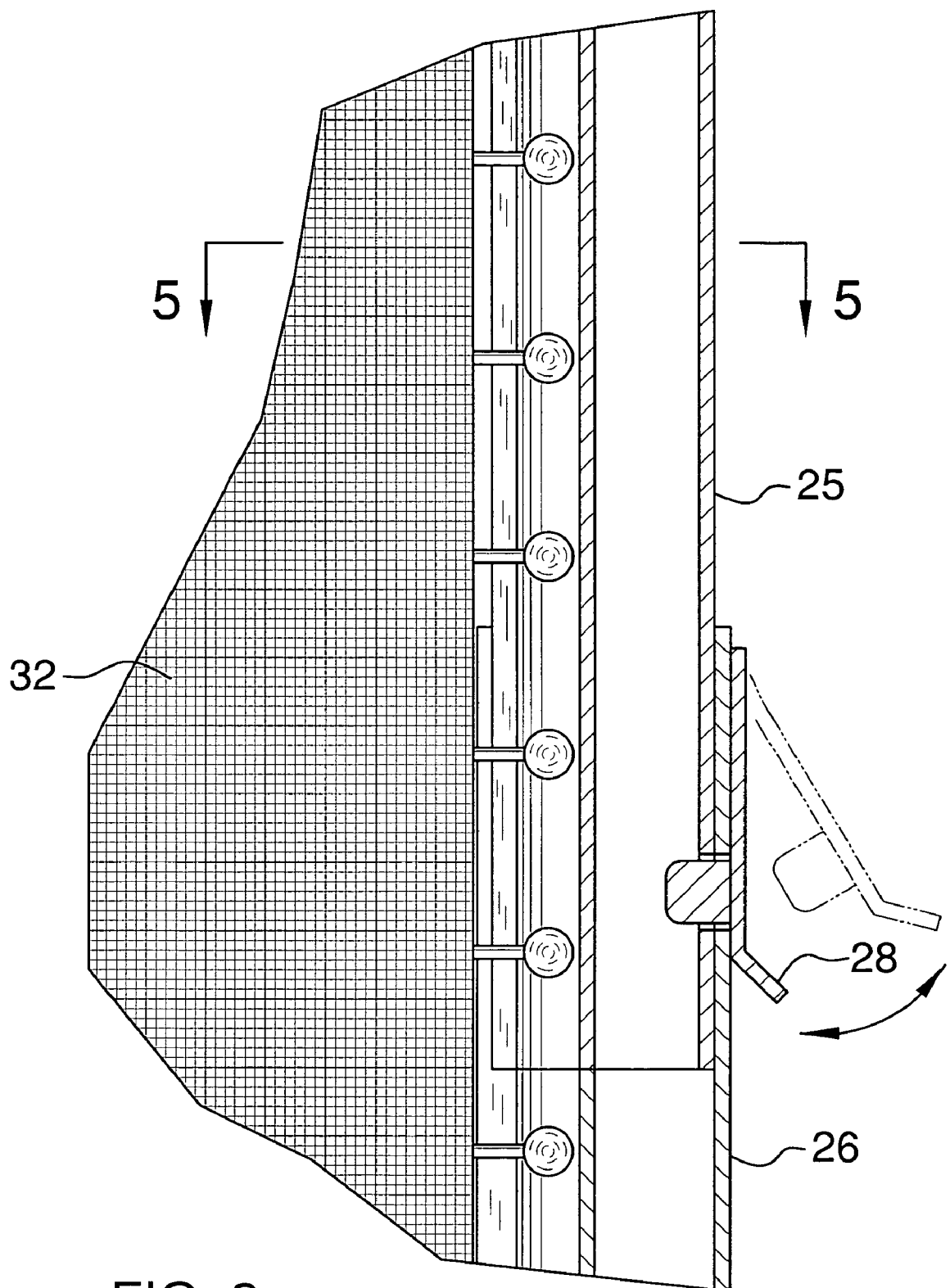
FIG. 3 is a cross-sectional view taken along line 3-3 of FIG. 1 of the present invention.
Figure 4:
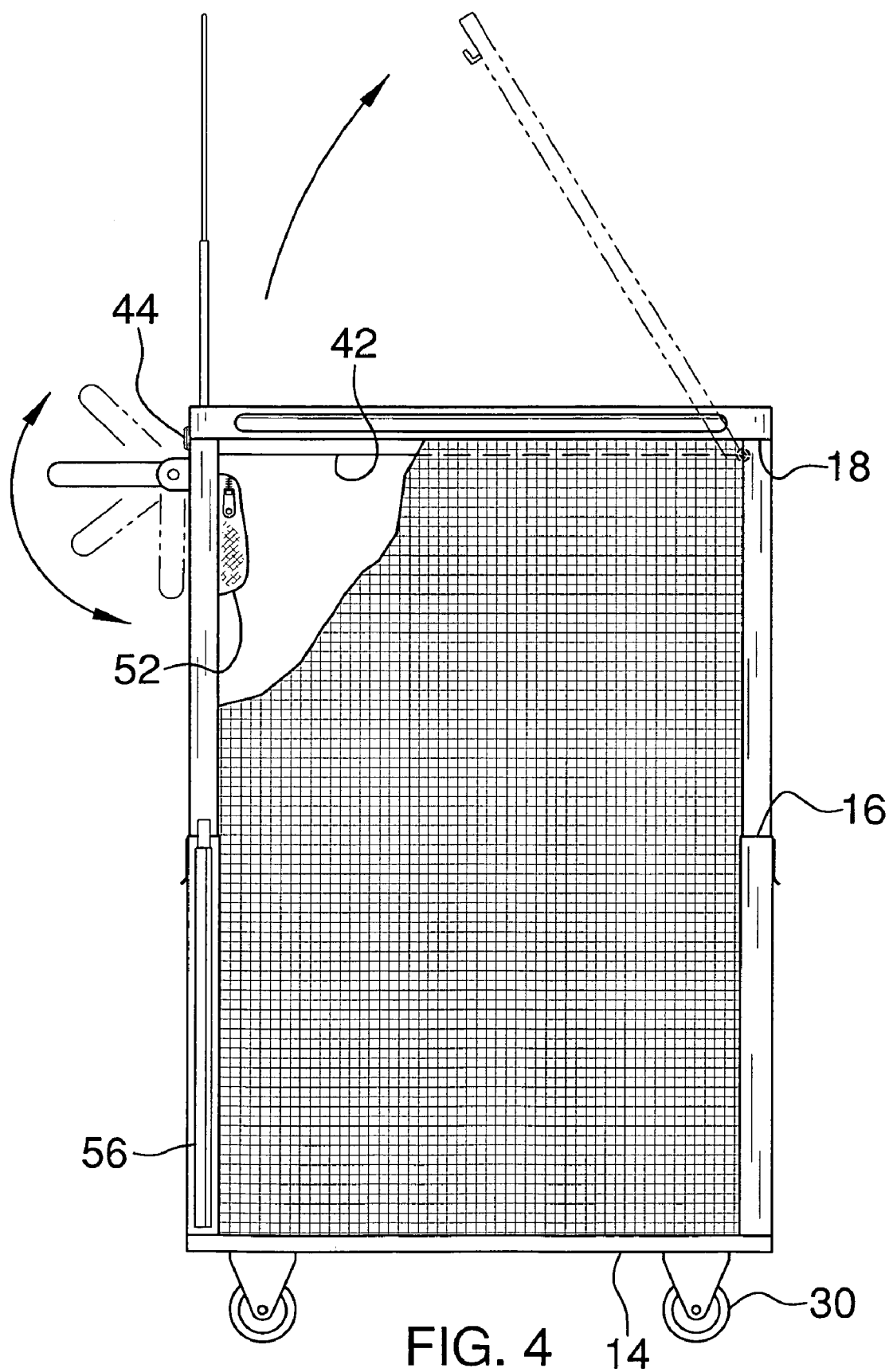
FIG. 4 is a broken side view of the present invention.
Figure 5:
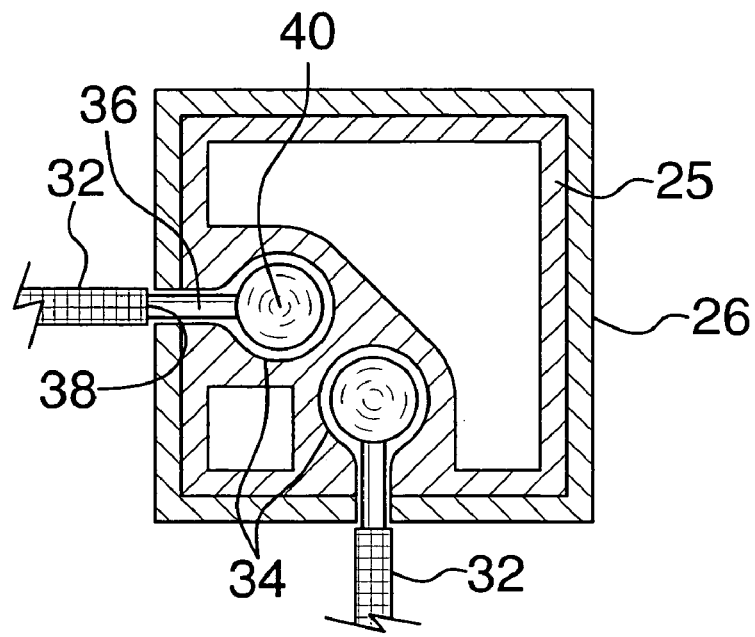
FIG. 5 is a cross-sectional view taken along line 5-5 of FIG. 3 of the present invention.
Figure 6:
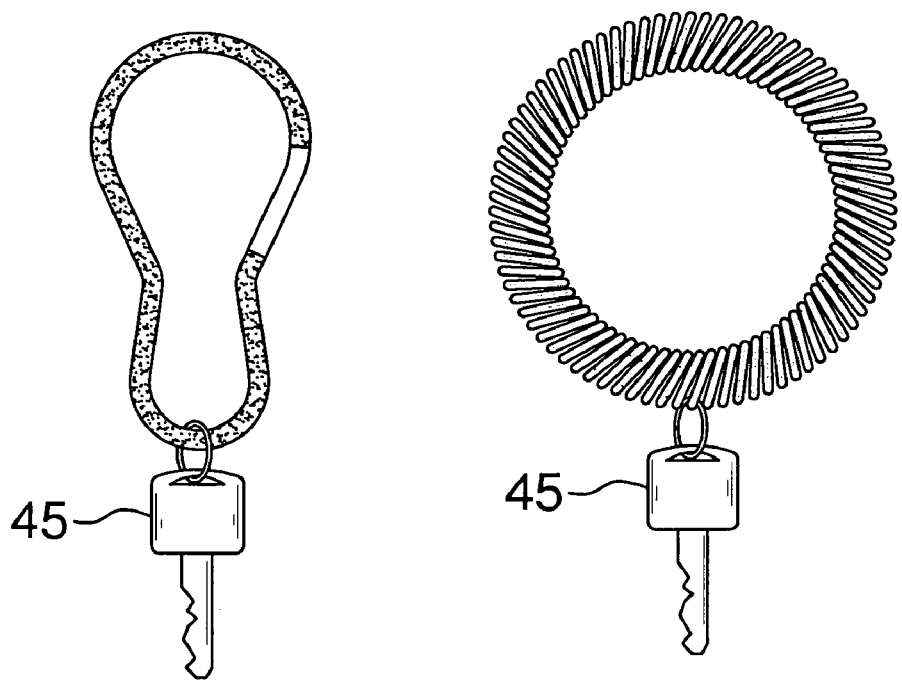
FIG. 6 is a front view of keys of the present invention.

With reference now to the drawings, and in particular to FIGS. 1 through 6 thereof, a new cart device embodying the principles and concepts of the present invention and generally designated by the reference numeral 10 will be described.

As best illustrated in FIGS. 1 through 6, the cart assembly 10 generally comprises a frame 12 that includes a bottom wall 14 that has a generally rectangular shape having four corners. Four posts 16 are attached to and extend upwardly from the bottom wall 14. Each of the posts 16 is positioned adjacent to one of the corners and each of the posts 16 has an upper end 18. Four bars 20 are each attached to and extend between a pair of adjacent ones of the upper ends 18 of the posts 16 so that the bars 20 form a rectangular loop. The bars 20 are positioned such that a front bar 21, a back bar 22, a first side bar 23 and a second side bar 24 of the loop are defined. Each of the posts 16 is selectively telescoping and each preferably includes an upper portion 25 retractable into a lower portion 26. When fully extended, the posts 16 each have a height generally between 24 inches and 32 inches. The bars 20 each have a length between 16 inches and 24 inches. A securing member 28 selectively locks the upper portion 25 in an extended position with respect to the lower portion 26. Each of a plurality of wheels 30 is rotatably coupled to a bottom surface of the bottom wall 14. The wheels 30 preferably include casters that are adapted for swiveling with respect to the bottom wall 14.

Four mesh walls 32 are provided. Each of the mesh walls 32 is attached to the bottom wall 14 and extends between an adjacent pair of the posts 16 so that each of the posts 16 has an adjacent pair of mesh walls 32 orientated perpendicular to each other. The mesh walls 32 are each vertically orientated and each is attached to one of the bars 20. Each of the mesh walls 32 is slidably coupled to an adjacent one of the posts 16. This may be accomplished with elongated slots 34 positioned in each of the posts 16 and extending along side edges of the mesh walls 32. Each of a plurality of dowels 36, preferably of a plastic or metallic material, has a first end 38 attached to one of the side edges of the mesh walls 32 and a second end 40 slidably mounted in one of the elongated slots 34.

A cover 42 is hingedly coupled to frame 12. The cover 42 is selectively positionable in an open position extending upwardly from the frame 12 or in a closed position orientated parallel to a plane of the loop. Preferably, the cover 42 is pivotally coupled to the posts 16 positioned on either side of the back bar 22 and is recessed below a plane of the loop when in a closed position. This will serve as a convenient place to set items such as soft drinks or food while shopping. A lock 44 is mounted on the frame 12 for selectively locking the cover 42 in the closed position. The lock 44 is conventional and preferably includes a key 45 actuated mechanism.

A handle 46 is attached to the frame 12. The handle 46 is positioned adjacent to the front bar 21. The handle 46 is selectively pivotable from a first position extending outwardly from the front bar 21 to a second position extending vertically downward. A pair of rails 48, 50 is provided. Each of the rails 48, 50 is attached to the frame 12. A first of the rails 48 is attached to the first side bar 23 and a second of the rails 50 is attached to the second side bar 24. A bag 52 is attached to an inner surface of one of the mesh walls 32 and is positioned adjacent to the front bar 21. The bag 52 preferably includes an opening that is closable with a zipper.

A pair of rods 56 is included. Each of the rods 56 is attached to one of the posts 16 and each of the rods 56 is selectively telescoping and includes a plurality of sections. Each of the rods 56 has an upper section 58. Each of a pair of hooks 60 is attached to one of the upper sections 58. The hooks 60 provide a place for a person to hang an item of clothing or to receive the handle of a bag.

In use, a person may use cart assembly 10 while shopping, such as in a shopping mall, to hold a variety of items purchased as well as acting as a table and personal belonging holder. The cover 42 may be opened so that bags, purses and other items are stored within the frame 12 and secured therein with the lock 44. The posts 16 are telescoping to allow the frame to be collapsed for easy transportation when not in use. The rails 48, 50 may also be used for hanging clothes on, as when the clothes are on a hanger.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A shopping cart assembly comprising:
   a frame including a bottom wall having a generally rectangular shape having four corners, four posts being attached to and extending upwardly from said bottom wall, each of said posts being positioned adjacent to one of said corners, each of said posts having an upper end, four bars each being attached to and extending between a pair of adjacent ones of said upper ends of said posts such that said bars form a rectangular loop, said bars being positioned such that a front bar, a back bar, a first side bar and a second side bar of said loop are defined, each of said posts being selectively telescoping;
   four mesh walls, each of said mesh walls being attached to said bottom wall and extending between an adjacent pair of said posts such that each of said posts has an adjacent pair of mesh walls orientated perpendicular to each other, each of said mesh walls being vertically orientated and being attached to one of said bars;
   a cover being hingedly coupled to frame, said cover being selectively positionable in an open position extending upwardly from said frame or in a closed position orientated parallel to a plane of said loop;
   a handle being attached to said frame;
   a pair of rails, each of said rails being attached to said frame, a first of said rails being attached to said first side bar, a second of said rails being attached to said second side bar; and
   a plurality of wheels being rotatably coupled to a bottom surface of said bottom wall.

2. The assembly according to claim 1, wherein each of said mesh walls is slidably coupled to an adjacent one of said posts.

3. The assembly according to claim 1, further including a lock being mounted on said frame for selectively locking said cover in said closed position.

4. The assembly according to claim 3, further including a bag being attached to an inner surface of one of said mesh walls and being positioned adjacent to said front bar.

5. The assembly according to claim 4, further including:
   a pair of rods, each of said rods being attached to one of said posts, each of said rods being selectively telescoping and including a plurality of sections, each of said rods having an upper section;
   a pair of hooks, each of said hooks being attached to one of said upper sections.

6. The assembly according to claim 1, further including a bag being attached to an inner surface of one of said mesh walls and being positioned adjacent to said front bar.

7. The assembly according to claim 1, further including:
   a pair of rods, each of said rods being attached to one of said posts, each of said rods being selectively telescoping and including a plurality of sections, each of said rods having an upper section;
   a pair of hooks, each of said hooks being attached to one of said upper sections.

8. A shopping cart assembly comprising:
   a frame including a bottom wall having a generally rectangular shape having four corners, four posts being attached to and extending upwardly from said bottom wall, each of said posts being positioned adjacent to one of said corners, each of said posts having an upper end, four bars each being attached to and extending between a pair of adjacent ones of said upper ends of said posts such that said bars form a rectangular loop, said bars being positioned such that a front bar, a back bar, a first side bar and a second side bar of said loop are defined, each of said posts being selectively telescoping;
   four mesh walls, each of said mesh walls being attached to said bottom wall and extending between an adjacent pair of said posts such that each of said posts has an adjacent pair of mesh walls orientated perpendicular to each other, each of said mesh walls being vertically orientated and being attached to one of said bars, each of said mesh walls being slidably coupled to an adjacent one of said posts;
   a cover being hingedly coupled to frame, said cover being selectively positionable in an open position extending upwardly from said frame or in a closed position orientated parallel to a plane of said loop, said cover being recessed downward from a plane of said loop when said cover is in said closed position, a lock being mounted on said frame for selectively locking said cover in said closed position;

a handle being attached to said frame, said handle being positioned adjacent to said front bar;

a pair of rails, each of said rails being attached to said frame, a first of said rails being attached to said first side bar, a second of said rails being attached to said second side bar;

a bag being attached to an inner surface of one of said mesh walls and being positioned adjacent to said front bar;

a pair of rods, each of said rods being attached to one of said posts, each of said rods being selectively telescoping and including a plurality of sections, each of said rods having an upper section;

a pair of hooks, each of said hooks being attached to one of said upper sections; and a plurality of wheels being rotatably coupled to a bottom surface of said bottom wall.

* * * * *